(12) United States Patent
Reinhardt

(10) Patent No.: US 7,721,679 B2
(45) Date of Patent: May 25, 2010

(54) VAPOR GENERATOR WITH PREHEATER AND METHOD OF OPERATING SAME

(75) Inventor: Aldon R. Reinhardt, Bethel Island, CA (US)

(73) Assignee: Goodfield Energy Corporation, Newark, CA (US)

( * ) Notice: Subject to any disclaimer, the term of this patent is extended or adjusted under 35 U.S.C. 154(b) by 0 days.

(21) Appl. No.: 11/239,310

(22) Filed: Sep. 28, 2005

(65) Prior Publication Data

US 2007/0283905 A1 Dec. 13, 2007

Related U.S. Application Data

(63) Continuation-in-part of application No. 10/686,097, filed on Oct. 14, 2003.

(51) Int. Cl.
*F22B 11/02* (2006.01)
(52) U.S. Cl. .............. 122/348; 122/235.12; 122/488
(58) Field of Classification Search ............... 122/1 B, 122/1 C, 34, 235.12, 332, 412, 420, 348, 122/468, 488
See application file for complete search history.

(56) References Cited

U.S. PATENT DOCUMENTS

| | | | |
|---|---|---|---|
| 1,935,659 A * | 11/1933 | Noack | .......... 122/24 |
| 1,948,940 A | 2/1934 | Noack | |
| 2,429,916 A * | 10/1947 | Belgau | ........... 122/14.21 |
| 3,854,453 A | 12/1974 | Mayer et al. | |
| 4,211,071 A | 7/1980 | Wyatt | |
| 4,288,978 A | 9/1981 | Wyatt | |
| 4,344,479 A | 8/1982 | Bailey | |
| 4,418,651 A | 12/1983 | Wyatt | |
| 4,463,803 A | 8/1984 | Wyatt | |
| 4,493,186 A | 1/1985 | Emsperger et al. | |
| 4,512,288 A | 4/1985 | Michaud | |
| 4,558,743 A | 12/1985 | Ryan et al. | |
| 4,633,821 A | 1/1987 | Cleer, Jr. | |
| 4,766,822 A | 8/1988 | De Cicco et al. | |
| 4,782,815 A | 11/1988 | Friedman et al. | |
| 4,884,529 A * | 12/1989 | Byrnes | ........... 122/115 |
| 4,895,136 A | 1/1990 | Poppe | |
| 4,993,402 A | 2/1991 | Ripka | |
| 5,088,450 A | 2/1992 | Sternfeld et al. | |

(Continued)

FOREIGN PATENT DOCUMENTS

EP 10054306 A 2/1998

(Continued)

*Primary Examiner*—Gregory Wilson
(74) *Attorney, Agent, or Firm*—Bever, Hoffman & Harms, LLP; E. Eric Hoffman

(57) ABSTRACT

An efficient high-temperature water vapor generator includes a combustion chamber and a surrounding structure, wherein a cavity is located therebetween. Water is pumped into the cavity at a location near a first end of the combustion chamber. Water is removed from the cavity at a location near a second end of the combustion chamber, opposite the first end. The water removed from the cavity is injected into the combustion chamber at a location near the first end. Fuel and air are also introduced into the combustion chamber at the first end. The fuel and air are ignited near the first end of the combustion chamber, thereby creating high-temperature water vapor, and pre-heating the water in the cavity surrounding the combustion chamber.

20 Claims, 6 Drawing Sheets

U.S. PATENT DOCUMENTS

| | | |
|---|---|---|
| 5,117,771 A | 6/1992 | Summers |
| 5,172,709 A | 12/1992 | Eckhardt et al. |
| 5,256,208 A | 10/1993 | Rafson |
| 5,425,415 A | 6/1995 | Master et al. |
| 5,437,899 A | 8/1995 | Quigley |
| 5,590,528 A | 1/1997 | Viteri |
| 5,613,452 A | 3/1997 | Marchesi et al. |
| 5,615,668 A | 4/1997 | Panz et al. |
| 5,680,764 A | 10/1997 | Viteri |
| 5,709,077 A | 1/1998 | Beichel |
| 5,715,673 A | 2/1998 | Beichel |
| 5,878,700 A | 3/1999 | Farzan et al. |
| 5,956,937 A | 9/1999 | Beichel |
| 5,970,702 A | 10/1999 | Beichel |
| 5,983,842 A | 11/1999 | Nishi |
| 6,016,773 A | 1/2000 | Zinke |
| 6,170,264 B1 | 1/2001 | Viteri et al. |
| 6,206,684 B1 | 3/2001 | Mueggenburg |
| 6,247,316 B1 | 6/2001 | Viteri |
| 6,293,277 B1 | 9/2001 | Panz et al. |
| 6,302,064 B1 | 10/2001 | Billoue et al. |
| 6,338,337 B1 | 1/2002 | Panz et al. |
| 6,389,814 B2 | 5/2002 | Viteri et al. |
| 6,523,349 B2 | 2/2003 | Viteri |
| 6,598,398 B2 | 7/2003 | Viteri et al. |
| 6,666,172 B2 | 12/2003 | Reinhardt |
| 6,772,712 B2 | 8/2004 | Reinhardt |
| 6,834,622 B2 | 12/2004 | Griffin et al. |

FOREIGN PATENT DOCUMENTS

| | | |
|---|---|---|
| WO | WO 89/09638 A1 | 10/1989 |
| WO | WO 2004/078542 A1 | 9/2004 |

\* cited by examiner

VAPOR GENERATOR WITH PREHEATER AND METHOD OF OPERATING SAME

RELATED APPLICATIONS

The present application is a continuation-in-part of U.S. patent application Ser. No. 10/686,097, filed Oct. 14, 2003, entitled "Environmental Clean-Up System", by Aldon R. Reinhardt.

FIELD OF THE INVENTION

The present invention relates to an electrical generation system that operates in response to a vapor generator.

BACKGROUND OF THE INVENTION

Soil pollution is becoming a significant problem in this country. In numerous locations around the country, hazardous wastes, such as MTBE's, volatile organic compounds (VOCs), poisons and other chemicals have been inadvertently released, thereby contaminating the surrounding soil. Such soil contamination can be caused, for example, by leaking underground storage tank sites (LUST sites). The hazardous waste may leak through the soil, eventually contaminating water supplies.

Cleaning up contaminated soil is both difficult and costly. Typically, the owner of a site containing contaminated soil is responsible for this soil. However, because there is no cost effective manner of cleaning the soil, the owners of contaminated soil typically pay to have the soil removed and stored at a remote location. One such location is the Kettleman Hazardous Waste Landfill, located near Fresno, Calif. The cost for removing and storing contaminated soil is typically about $65/cubic yard.

It would therefore be desirable to have a cost efficient method and apparatus for cleaning contaminated soil. It would further be desirable if this method and apparatus were portable, such that contaminated soil could be de-contaminated on-site, without requiring that the contaminated soil be transported a significant distance.

In addition, it would be desirable to have a vapor generator capable of efficiently generating high-temperature water vapor for a multitude of uses including, but not limited to: de-contamination, in-situ heating of oil reserves to facilitate pumping, food preparation, cleaning and disinfecting, snow and ice removal, desalinization of sea water, generation of electricity, drying and curing, space heating and humidification, and the conversion of organic waste to other products.

SUMMARY

Accordingly, the present invention provides an efficient high-temperature water vapor generator, which can be used to de-contaminate soil, and for many other applications. The vapor generator includes a generally cylindrical combustion chamber and a surrounding structure, wherein a cavity is located between the combustion chamber and the surrounding structure. Water is routed through the cavity and into the combustion chamber, where water vapor and heat are generated in the presence of fuel, ignition and air. The heat generated inside the combustion chamber causes the water in the cavity to pre-heat. As a result, the water that is introduced to the combustion chamber is pre-heated, thereby improving the efficiency of the water vapor generator.

The high-temperature water vapor is forced into a vapor tube, which includes openings for emitting the vapor. The vapor heats the heating the vapor tube to temperatures of 600° F. or greater. In one embodiment, the vapor tube is mounted in a horizontal configuration over a fixed platform.

A cylindrical soil tube is supported such that this soil tube surrounds the vapor tube. Contaminated soil in introduced to a first end of the soil tube. The soil tube is rotated along its central axis by a drive assembly. Lifting paddles are located on the inner surface of the soil tube, thereby lifting the contaminated soil into contact with the vapor tube. The soil is decontaminated by coming into contact with the high temperature vapor tube. That is, hydrocarbons in the soil are cracked by the high temperature. The lifting paddles move the soil toward the second end of the rotating soil tube, such that decontaminated soil is expelled at the second end of the soil tube.

The decontamination process results in waste gases being emitted from within the soil tube. In one embodiment, these waste gases are routed into the vapor generator, thereby burning these waste gases and providing a more efficient system.

The soil remediation unit of the present invention is compact, and can easily be mounted on a truck bed, a trailer or a barge. Moreover, the vapor generator and drive assembly can be operated in response to one or more portable batteries, a portable fuel supply and a portable (or non-portable) water supply. Thus, the soil remediation unit can be brought to the location where the contaminated soil resides. Because the soil remediation unit decontaminates the soil on-site, there is no need to remove any contaminated soil to a remote location.

In accordance with another embodiment, the high-temperature water vapor provided by the vapor generator can be routed into the ground, thereby heating heavy oil reserves located in the ground. Heating the oil reserves in this manner reduce the viscosity of the heavy oil, thereby enabling the oil to be easily pumped to the surface.

The present invention will be more fully understood in view of the following description and drawings.

DETAILED DESCRIPTION

Figure 1:
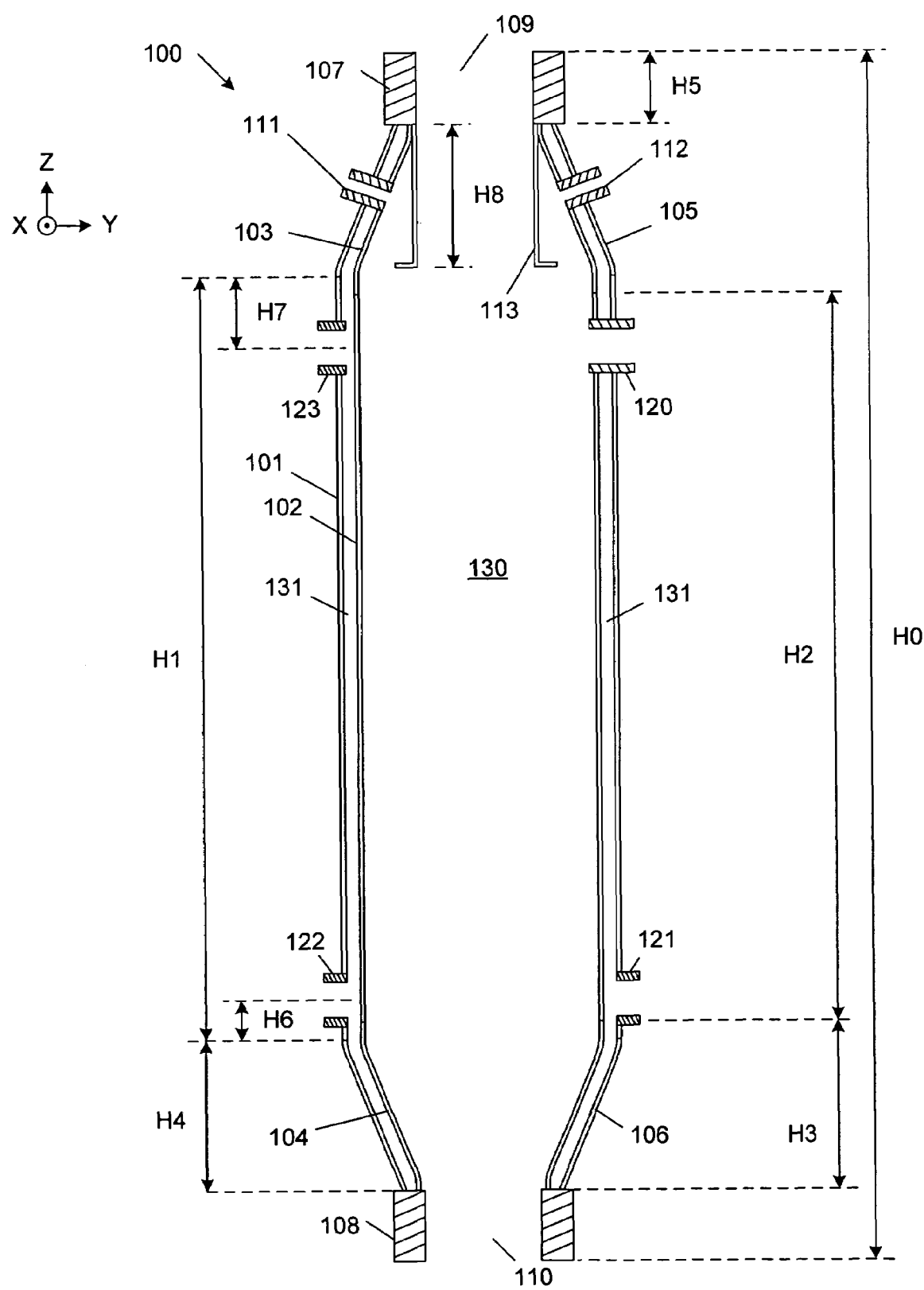
FIG. 1 is a cross sectional diagram of a vapor generator in accordance with one embodiment of the present invention.

FIG. 1 is a cross sectional diagram that illustrates a vapor generator 100 in accordance with one embodiment of the present invention. Vapor generator 100 is illustrated with an X-Y-Z coordinate system, as illustrated. Vapor generator 100 is generally cylindrical in nature, with the central axis of the cylinder parallel with the Z-axis.

Vapor generator 100 includes outer cylindrical section 101, inner cylindrical section 102, a pair of inner conical structures 103-104, a pair of outer conical structures 105-106, an air coupling element 107, a vapor coupling element 108, an ignition coupling element 111, a fuel coupling element 112, vapor baffle element 113, and water coupling elements 120-123.

In the described embodiment, the elements of vapor generator 100 are made of 304-stainless steel. However, it is understood that vapor generator 100 can be made of other materials in other embodiments. In the described embodiment, vapor generator 100 has a height (H0) of about 43¼ inches. Outer cylindrical section 101 is a tube having an outside diameter of six inches and a height (H1) of 32 inches. The walls of outer cylindrical section 101 have a thickness of 0.120 inches. Outer conical element 105 is connected to the upper end of outer cylindrical section 101, and outer conical element 106 is connected to the lower end of outer cylindrical section. The ends of outer conical elements 105-106 that are connected to the ends of outer cylindrical section 101 have outside diameters equal to 6 inches. The walls of outer conical elements have a thickness of 0.120 inches. Thus, the ends of outer conical elements 105-106 have the same dimensions as the ends of outer cylindrical section 101. In accordance with one embodiment, the outer conical elements 105-106 are connected to the ends of outer cylindrical section 101 by a conventional welding process. Each of the outer conical elements 105-106 tapers down from a maximum diameter of 6 inches to a minimum diameter of 4 inches. Each of the outer conical elements 105-106 has a height (H4) of about 4 inches along the Z-axis.

Inner cylindrical section 102 is a pipe having an outside diameter of 5 9/16 inches and a height (H2) of 30 inches. The walls of outer cylindrical section 101 have a thickness of 0.40 inches. Inner conical element 103 is connected to the upper end of inner cylindrical section 102, and inner conical element 104 is connected to the lower end of inner cylindrical section 102. The ends of inner conical elements 103-104 that are connected to the ends of inner cylindrical section 102 have outside diameters equal to 5 inches. The walls of inner conical elements 103-104 have a thickness of 0.40 inches. Thus, the ends of inner conical elements 103-104 have the same dimensions as the ends of inner cylindrical section 102. In accordance with one embodiment, the inner conical elements 103-104 are connected to the ends of inner cylindrical section 102 by a conventional welding process. Each of the inner conical elements 103-104 tapers down from a maximum diameter of 5 inches to a minimum diameter of 3 inches. Each of the inner conical elements 103-104 has a height (H3) of about 5 inches along the Z-axis.

The smaller ends of inner conical element 103 and outer conical element 105 are connected to air coupling element 107. In the described embodiment, the smaller ends of inner conical element 103 and outer conical element 105 are welded to the underside of the cylindrical air coupling element 107, such that these conical elements are concentrically located around a central axis (which is parallel with the Z-axis). In the described embodiment, air coupling element 107 is a cylindrical element having an inside diameter of 3 inches, an outside diameter of 4.5 inches, and a height (H5) of about 1 5/8 inches. As described in more detail below, the opening 109 of air coupling element 107 is subsequently configured to receive an inflow of air.

Vapor baffle 113 is also connected to the lower surface of air coupling element 107. In the described embodiment, vapor baffle 113 is a pipe having an inside diameter of 3 inches, a wall thickness of about 0.118 inches, and a height (H8) of about 4 inches (along the Z-axis). The bottom edge of this pipe has a flange that extends outward from the central axis of the pipe. In the described embodiment, this flange has an outer diameter of about 5 inches. As described in more detail below, vapor baffle 113 regulates the flow of gasses within vapor generator 100.

The smaller ends of inner conical element 104 and outer conical element 106 are connected to vapor coupling element 108 in the same manner that inner conical element 103 and outer conical element 105 are connected to air coupling element 107. In the described embodiment, vapor coupling element 108 is identical to air coupling element 107. As described in more detail below, the opening 110 of vapor coupling element 108 is subsequently configured to provide an outflow of heated water vapor.

A cavity 131 is formed between the inner conical elements 103-104/inner cylindrical element 102 and the outer conical elements 105-106/outer cylindrical element 101. As described in more detail, this cavity 131 is used to store (and pre-heat) water during normal operating conditions of vapor generator 100. Cavity 131 is capable of storing approximately 200 gallons of water.

A combustion chamber 130 is defined by inner conical elements 103-104, inner cylindrical element 102, air coupling element 107 and vapor coupling element 108. As described in more detail below, a fuel/air mixture is ignited in the combustion chamber 130, thereby heating water that has been injected into the combustion chamber 130.

Ignition coupling element 111 is a cylindrical element that extends through inner and outer conical elements 103 and 105, as illustrated. In the described embodiment, ignition coupling element 111 has an outside diameter of 1 inch, an inside diameter of 14 mm, and a length of 1⅛ inches. The cylindrical opening through ignition coupling element 111 is threaded for receiving an ignition element (e.g., a spark plug). As described in more detail below, the ignition element introduces sparking within combustion chamber 130. The opening of ignition coupling element 111 is located about 2 inches below the lower surface of air coupling element 107.

Fuel coupling element 112 is also a cylindrical element that extends through inner and outer conical elements 103 and 105, as illustrated. In the described embodiment, fuel coupling element 112 has an outside diameter of ⅜ inches, an inside diameter of 5/16 inches and a length of about 1¼ inches. The cylindrical opening through fuel coupling element 112 is configured to receive a fuel line. The opening of fuel coupling element 112 is located about 2 inches below the lower surface of air coupling element 107. As described in more detail below, a fuel, such as propane or natural gas, is introduced to combustion chamber 130 via fuel coupling element 112. This fuel is ignited by sparks provided by the ignition element. As described in more detail below, vapor baffle 113 helps to contain the fuel in the same general vicinity as the ignition element, thereby improving the burn of the fuel.

Water coupling elements 120-123 are also cylindrical elements. In the described embodiment, these elements 120-123 each have an outer diameter of 1 inch, an inner diameter of ½ inches. Water coupling element 120, which has a length of about 1½ inches, extends through both outer cylindrical section 101 and inner cylindrical section 102. As described in more detail below, water coupling element 120 is configured to receive a water injection device, such that water can be injected into inner chamber 130. Water coupling elements 121-123, each of which has a length of about 1½ inches, extends through outer cylindrical section 101 (but not through inner cylindrical section 102). The central axes of water coupling elements 121-122 are located at a height (H6) of about 1½ inches above the lower edge of outer cylindrical section 101. The central axes of water coupling elements 120 and 123 are located at a distance (H7) of about 2½ inches below the upper edge of outer cylindrical section 101.

As described in more detail below, water is introduced into cavity 131 via water coupling element 123. The water level in cavity 131 is maintained at a level that is higher than water coupling element 123. As described in more detail below, water is removed from cavity 131 via one or more of the water coupling elements 121 and 122.

Although vapor generator 100 has been described with particular dimensions and shapes, it is understood that other dimensions and shapes can be used in other embodiments.

Figure 2:
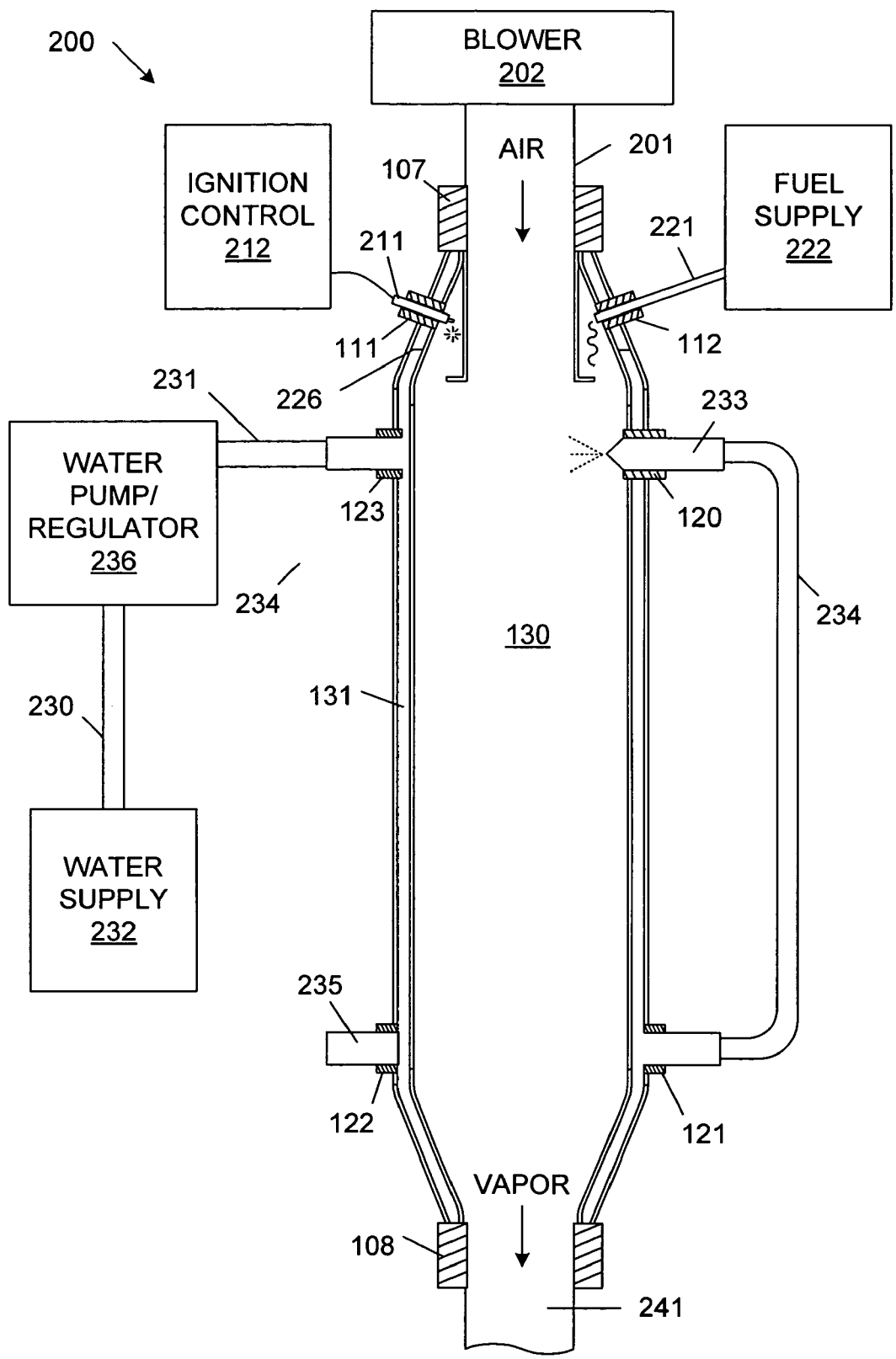
FIG. 2 is a block diagram illustrating a vapor generating system that uses the vapor generator of FIG. 1 in accordance with one embodiment of the present invention.

FIG. 2 is a block diagram illustrating a vapor generating system 200 that uses vapor generator 100 in accordance with one embodiment of the present invention. In addition to vapor generator 100, system 200 includes air supply line 201, blower 202, ignition element 211, ignition controller 212, fuel supply line 221, fuel supply 222, water supply lines 230-231, water supply 232, water injector 233, pre-heated water supply line 234, water plug 235, water pump/regulator 236 and vapor exhaust line 241.

In general, system 200 operates as follows to produce high temperature steam (vapor). As described in more detail below, this high temperature vapor is subsequently used to decontaminate a material, such as soil, or to heat heavy oil deposits located underground. Air, water, fuel and sparks are introduced to vapor generator 100 by air blower 202, water injector 233, fuel supply 222 and ignition element 211, respectively. The sparks ignite the fuel and air to heat the injected water. In response, vapor generator 100 generates super-heated steam (vapor) having a temperature of about 400 to 1000° F. The high temperature water vapor is forced out through vapor exhaust line 241. As described in more detail below, exhaust line 241 carries the high temperature water vapor to a soil moving device or an underground oil reserve. The high temperature water vapor is then used to remove contaminants from soil that is forced through the soil moving device. Alternately, the high temperature water vapor is used to heat underground oil reserves, thereby reducing the viscosity of the underground oil and enabling this oil to be pumped to the surface.

In the described embodiment, air supply line 201 is flexible aluminum tubing having an inside diameter of 3 inches and a length of about 20 inches. Other lengths and diameters can be used in other embodiments. Air supply line 201 can be coupled to air coupling element by a clamp. When air blower 202 is turned on, air is forced through air supply line 201 and into combustion chamber 130. In the described embodiment, air blower 202 is a 10 horsepower (hp) high-speed hydraulic motor available from Spencer Industries, as part number EAT104-1006-006. This hydraulic motor is capable of operating at about 2000 rpm in response to a 24 Volt supply battery. In the described embodiment, air blower 202 provides an air flow in the range of about 200 to 700 cubic feet per minute (cfpm) at a maximum pressure in the range of about 2 to 5 pounds/square inch (psi). Other air blowers can be used in other embodiments of the present invention.

In the described embodiment, both fuel coupling element 112 and fuel supply line 221 have an inside diameter of about ⅜ inch. Fuel supply line 221, which is made of stainless steel, is coupled to fuel coupling element with a conventional metal sealed connector. Fuel supply 222 is controlled to provide a flow of fuel through fuel supply line 221 and fuel coupling element 112 into combustion chamber 130. In the described embodiment, the fuel supply 222 is a 100-gallon fuel tank containing either propane or natural gas. Fuel supply 222 can be controlled manually or automatically in various embodiments of the present invention. The maximum fuel flow into combustion chamber 130 is on the order of 40 to 80 standard cubic feet per hour (scfh). In one embodiment, the fuel flow is about 2 gallons per hour, for a daily (8 hour) fuel cost of about $20. In the described embodiment, a control valve is inserted into fuel coupling element 112, thereby limiting the fuel pressure to about 8 psi.

In the described embodiment, ignition element 211 is located at the same height as fuel coupling element 112, with a 180 degree separation between ignition element 211 and fuel coupling element 112. Ignition element 211 can be, for example, a spark plug available from Bosch as part number W6DC. Other spark plugs can be used in other embodiments. Ignition controller 212 transmits electrical control signals to ignition element 211. These electrical control signals are selected such that ignition element 211 fires (sparks) continuously while these electric control signals are being transmitted. Continuously firing ignition element 211 advantageously prevents the accumulation of combustion products on the surfaces of ignition element 211. The electrodes of ignition element 211 are located inside of combustion chamber 130, such that the sparks are created within combustion chamber 130. The expected life of ignition element 211 under these conditions is on the order of about 5000 hours. In the described embodiment, ignition controller 212 is a spark generator available from Dongan Electric Manufacturing Company as part number A06SAG. Ignition controller 212 is capable of operating in response to a 24 Volt battery supply.

Water supply line 230 couples water supply 232 to water pump/regulator 236. In response, water pump/regulator 236 provides a controlled flow of water to water supply line 231 and water coupling element 123. Water pump/regulator 236 can be, for example, product number PA38IN available from The Berns Corporation, which is a water pump capable of providing a maximum flow of 10 gallons per minute (GPM) at a pressure up to 240 PSI. In another embodiment, water pump/regulator 236 can be obtained from Shurflo as part number 52063-B979. In the described embodiment, water supply lines 230-231 are made of rubber hose having an inside diameter of about 1 inch. Water supply line 231 is coupled to water coupling element 123 by a ½ inch pipe nipple. In one embodiment, a ⅜ inch Nupro ball valve is included in water coupling element 123.

Water pump/regulator 236 pumps water into cavity 131 at a controlled pressure. In the described embodiment, water is pumped into cavity 131 at a pressure of about 70 psi. Water pump/regulator 236 advantageously enables a constant, controllable water flow to be provided, regardless of the characteristics of water supply 232. In the described embodiment, water coupling element 122 is sealed by plug 235. In this embodiment water coupling element 122 provides redundancy, in case water coupling element 121 is (or becomes) defective. The water level 226 within cavity 131 is controlled such that this water level 226 is higher than water coupling element 123. In a particular embodiment, water level 226 is controlled such that cavity 131 is substantially full during normal operation of system 200.

The water in cavity 131 is heated due to the proximity to combustion chamber 130. That is, heat from the combustion chamber 130 heats the water in cavity 131 via the thermally conductive inner cylindrical section 102 and inner conical structures 103-104. In one embodiment, the water in cavity 131 is heated to a temperature of about 60 to 212° F. Water pump/regulator 236 forces the heated water to exit cavity 131 and enter pre-heated water supply line 234, near the lower end of the combustion chamber 130. Pre-heated water supply line 234, which withstand the heat of the pre-heated water, can be, for example, metal tubing. From pre-heated water supply line 234, the heated water enters water injection element 233. In response, water injection element 233 causes the heated water to enter combustion chamber 130 as a spray. In the described embodiment, water injection element 233 injects water at a rate of 2 to 5 gallons/minute (gpm). Water injection element 233 can be, for example, part number 137-155, available from Delaven. In accordance with the present embodiment, water is introduced to the upper end of cavity 130 through water coupling element 123 and extracted from the lower end of cavity 130 through water coupling element 121. This configuration helps to ensure that water, and not steam, flows from cavity 131 to pre-heated water supply line 234. Note that any steam forming in cavity 131 will collect near the upper end of cavity 131. Thus, it may be difficult to extract water at the upper end of cavity 131.

Within combustion chamber 130, the sparks introduced by ignition element 211 ignite the fuel introduced by fuel supply 222 and the air introduced by blower 202, thereby generating heat, which in turn, causes the pre-heated water introduced by water injection element 233 to become super-heated. Air blower 202 forces the burnt fuel/water mixture (hereinafter referred to as the "vapor") toward the bottom of combustion chamber 130. The vapor pressure is increased as the combustion chamber 130 narrows.

Locating ignition element 211 and fuel coupling element 221 near the top of the combustion chamber 130 advantageously allows a long time for the fuel to burn. That is, the fuel is allowed to burn down the entire length of the combustion chamber 130. This allows the fuel to burn completely. The length of the combustion chamber 130 is selected to be long enough to allow the fuel to burn completely. The pre-heated water is also introduced near the top of the combustion chamber 130, thereby allowing this water to be heated along the entire length of the combustion chamber 130, such that the pre-heated water is completely converted to heated water vapor.

The force introduced by air blower 202 further causes the vapor to flow through vapor supply line 241. The vapor in vapor supply line 241 has a temperature in the range of about 200 to 1400° F. and a pressure in the range of about ½ to 5 psi. In one embodiment, vapor supply line 241 is stainless steel tubing, having a diameter of about 2 inches. The exhaust provided at vapor supply line 241 is relatively clean. It is estimated that the vapor will consist of about: 20% water vapor, 5% CO, 10% $O_2$, 63% $CO_2$ and 2% NO.

In accordance with one embodiment, system 200 is started as follows. First, air blower 202 and ignition controller 212 are turned on. As a result, any residual fuel in combustion chamber 130 will be safely burnt and blown out of vapor supply line 241. About ten seconds later, fuel supply 222 is turned on, thereby providing fuel flow to combustion chamber 130. At this time, fuel begins burning, thereby pre-heating combustion chamber 130. About ten seconds after fuel supply 222 is turned on, water pump/regulator 236 is turned on, thereby introducing water to combustion chamber 130. Vapor is then generated in combustion chamber 130 in the manner described above.

In accordance with another embodiment, system 200 is turned off by turning off fuel supply 222, ignition controller 212 and water supply 232 at about the same time. Blower 202 is allowed to run for about 30 seconds longer, thereby clearing combustion chamber 130 and vapor supply line 241.

Figure 3:
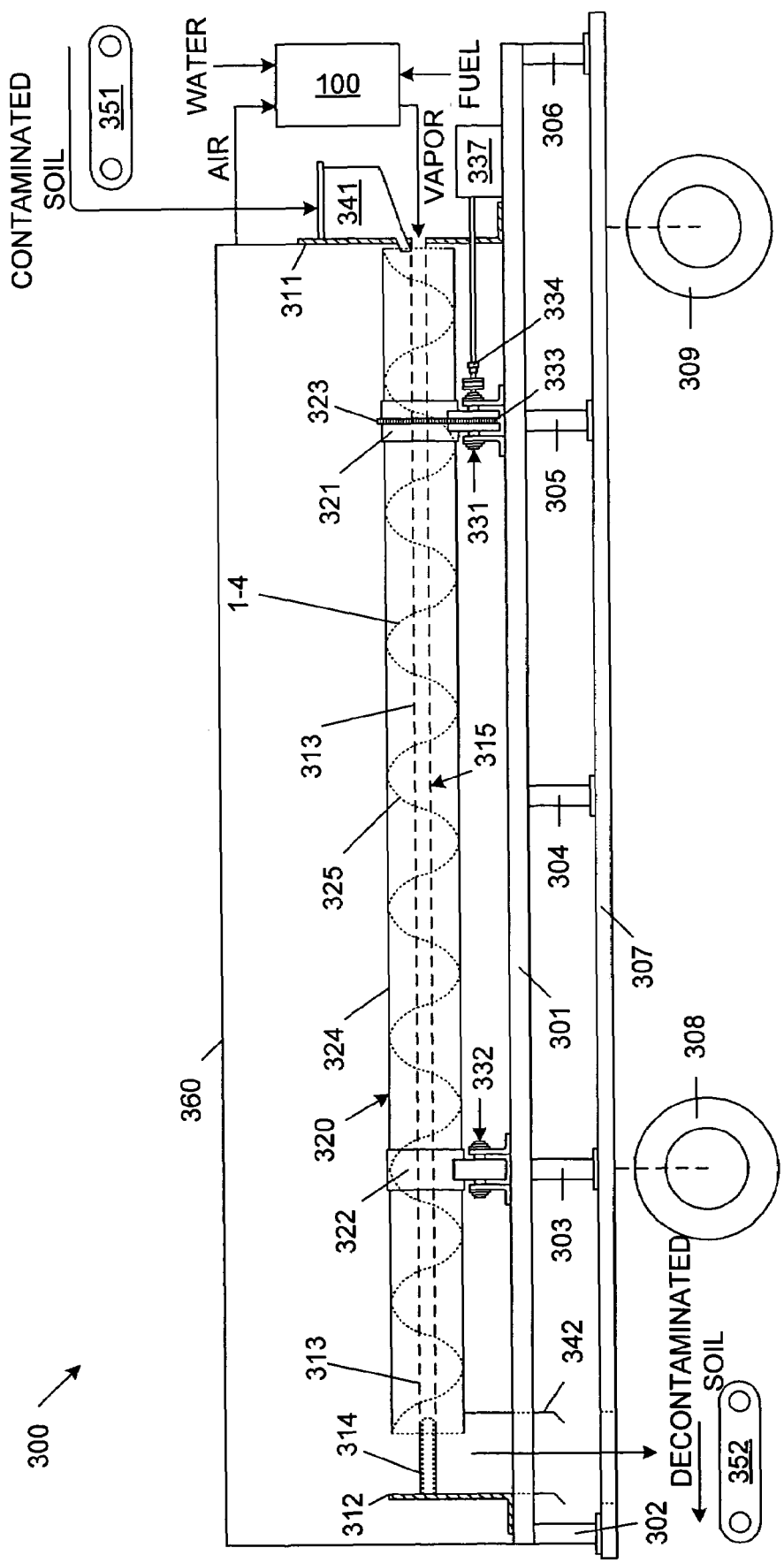
FIG. 3 is a schematic side view of a soil remediation system, which uses the vapor generator system of FIG. 2 to de-contaminate soil in accordance with one embodiment of the present invention.
Figure 4:
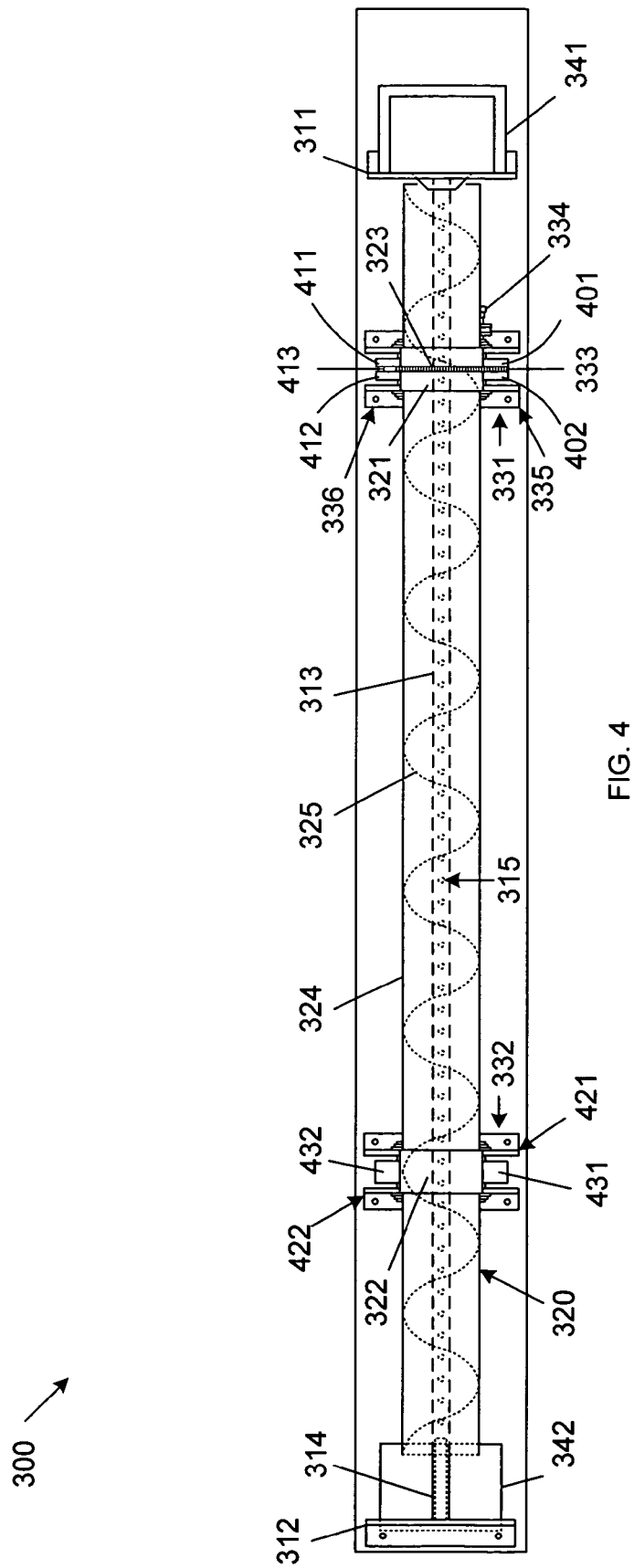
FIG. 4 is a schematic top view of the soil remediation system of FIG. 3 in accordance with one embodiment of the present inventions.

FIG. 3 is a schematic side view of a soil remediation system 300, which uses vapor generator system 200 to de-contaminate soil in accordance with one embodiment of the present invention. FIG. 4 is a schematic top view of soil remediation system 300. Note that vapor generator system 200 is not shown in FIG. 4 for reasons of clarity. Soil remediation system 300 includes a base assembly 301, which is formed from steel. In the described embodiment, base assembly 301 has a height of about 4 inches, a length of about 276 inches and a width of about 40 inches. Base assembly 301 is supported by ten support legs, including support legs 302-306. Note that five support legs (not shown) are hidden behind support legs 302-306 in the side view of FIG. 3. Each support leg is made of steel. In the described embodiment, each of the support legs has a height of about 18 inches and a square cross section of about 4 inches by 4 inches. The support legs are welded to base assembly 301.

The support legs are also welded to an underlying platform 307. In the described embodiment, platform 307 is the bed of a large truck or trailer. In the described embodiment, platform 307 is supported by four or more wheels of the truck/trailer, including wheels 308-309, by conventional means. Note that two wheels (not shown) are hidden behind wheels 308-309 in the side view of FIG. 3. In other embodiments, platform 307 can be a raised stationary structure.

System 300 further includes a front support assembly 311 and a rear support assembly 312, each having an L-shaped cross section. The bases of front and rear support assemblies 311-312 are bolted down to base assembly 301. In the described embodiment, front and rear support assemblies 311-312 are made of steel having a thickness of about 1 inch. The bases of front and rear support assemblies 311-312 each have a length of about 8 inches and a width of about 36 inches. Front support assembly 311 has a height of about 57½ inches, and rear support assembly 312 has a height of about 31 inches. An inner tube rear support 314 is welded to rear support assembly 312 as illustrated. Inner tube rear support 314 is a cylindrical steel tube having a length of about 18 inches, and an outside diameter of about 3½ inches.

A vapor tube 313 extends between, and is supported by, front and rear support assemblies 311-312. A first end of vapor tube 313 extends through an opening in front support assembly 311. In one embodiment, the first end of vapor tube 313 is welded in this opening. The first end of vapor tube 313 is open. As described in more detail below, this opening in vapor tube 313 is coupled to receive the high temperature vapor provided by vapor generator 100.

The second end of vapor tube 313 fitted over inner tube support assembly 314, as illustrated. As a result, inner tube support assembly 314 supports the second end of vapor tube 313. The second end of vapor tube 313 is welded to rear support assembly 312. As a result, the second end of vapor tube 313 is effectively sealed. In the described embodiment, vapor tube 313 is schedule 40 type 347 stainless steel cylindrical tube, having a 4 inch outside diameter, a wall thickness of 0.237 inches, and a length of 216¼ inches. In other embodiments, vapor tube 313 can have other shapes. For example, vapor tube 313 can have a triangular cross section, with a vertex of the vapor tube pointing straight up.

A plurality of vapor openings 315 extend through a sidewall of vapor tube 313. These vapor openings 315 are located along the length of vapor tube 313. In a particular embodiment, these vapor openings 315 are all located along a straight line that extends along the length of vapor tube 313. Vapor tube 313 is positioned such that these vapor openings 315 are located on the underside of vapor tube 313. In the described embodiment, there are about 29 vapor openings located on the underside of vapor tube 313, each having a diameter of about ⅜ inches. As described in more detail below, the high temperature vapor from vapor generating system 200 enters the first end of vapor tube 313 and exits through vapor openings 315. The high temperature vapor heats vapor tube 313 to a temperature that is sufficiently high to remove contaminants from soil.

A drive assembly 331 and an idler assembly 332 are also mounted on base assembly 301. Drive assembly 331 and idler assembly 332 support a main auger assembly 320, which surrounds, but does not contact, vapor tube 313. Main auger assembly 320 includes wear cylinders 321-322, gear element 323, soil tube 324, and internally located lift paddles 1-4. In the described embodiment, soil tube 324 is a schedule 40 C/S pipe having an outside diameter of 20 inches and a length of 216 inches. In other embodiments, soil tube 324 can have other dimensions. For example, soil tubes having diameters of 30 or 40 inches can be used to provide more soil throughput. The location of soil tube 324 is maintained by gear element 323, which engages a corresponding gear element 333 on drive assembly 331. Soil tube 324 is positioned such that a ½ inch clearance is maintained between a first end of soil tube 324 and front support assembly 311.

During normal operation, soil tube 324 is rotated along its central axis, around the stationary vapor tube 313. This rotation is facilitated by drive assembly 331, idler assembly 332 and motor 337. As shown in FIG. 4, drive assembly 331 includes a rotating drive element 335 and a rotating support element 336. Rotating drive element 335 includes two wear rings 401-402, which contact wear ring 321, and a recessed gear element 333, which engages raised gear element 323. Rotating support element 336 includes wear rings 411-412, which contact wear ring 321, and a recessed channel 413, which is located between wear rings 411-412. Recessed channel 413 receives, but does not contact gear element 323. In the described embodiment, wear rings 401-402 and 411-412 are made of the same material as wear ring 323.

Idler assembly 332 includes a first rotating idler assembly 421 and a second rotating idler assembly 422. The first rotating idler assembly 422 includes a first rotating wear ring 431, which contacts wear ring 322. The second rotating idler assembly 422 includes a second rotating wear ring 432, which contacts wear ring 322. The first and second rotating wear rings 431-432 rotate about a pair of corresponding axles, which are supported by a corresponding pair of brackets, which are connected to base assembly 301.

Figure 5:
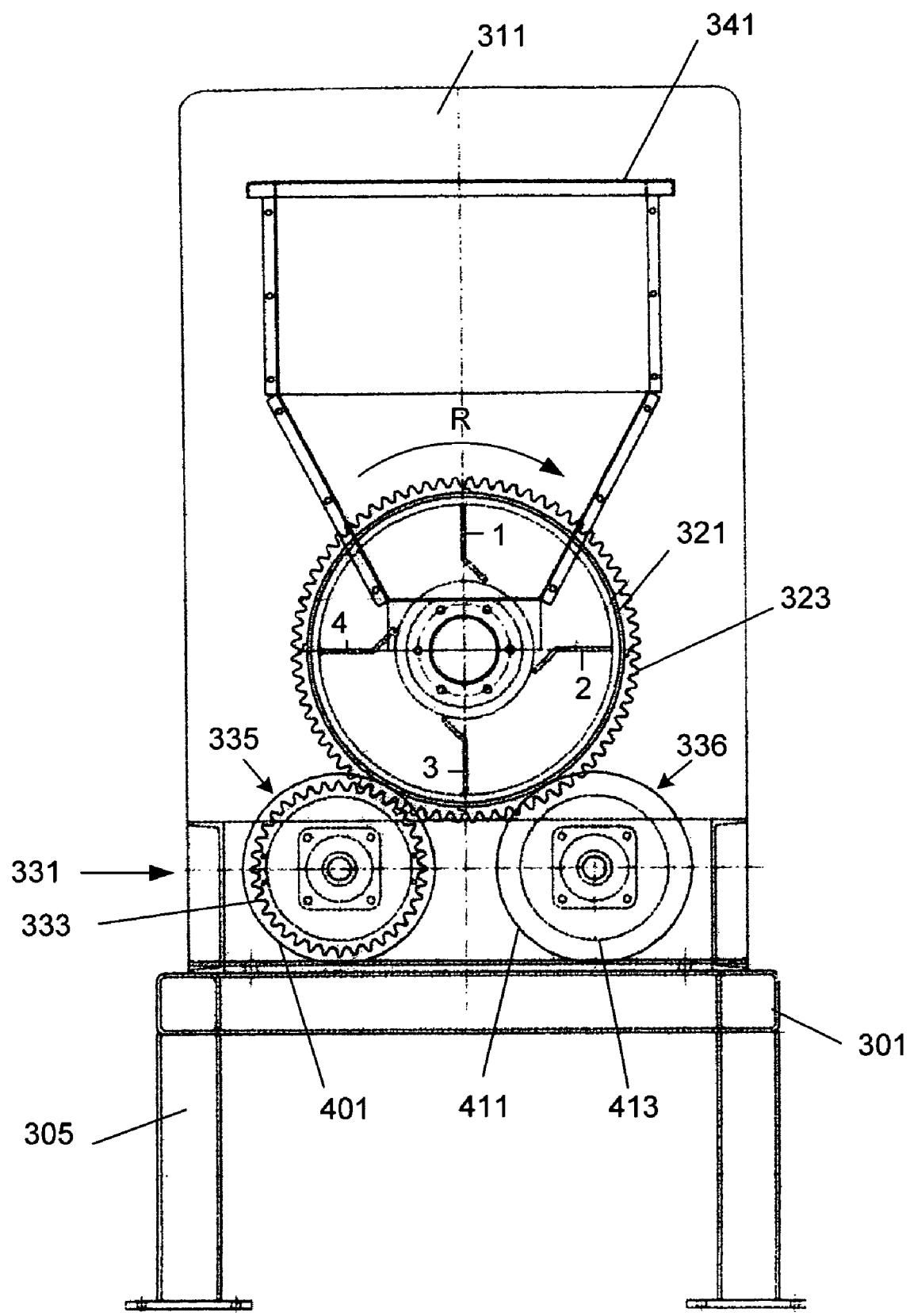
FIG. 5 is an end view of a portion of the soil remediation system of FIG. 3 in accordance with one embodiment of the present invention.

FIG. 5 is an end view of wear ring 321, gear element 323 and drive assembly 331. Note that gear element 323 extends above wear ring 321. In the described embodiment, gear element 323 has a height of 24 inches and a width of 1⅛ inches. In the described embodiment, gear element 323 is formed by one or more laser cut pieces of A36 steel, which are welded to wear ring 321. As described above, gear element 333 is slightly recessed with respect to wear rings 401-402, such that gear element 333 engages with gear element 323, and wear rings 401-402 contact wear ring 321. Also, as described above, wear rings 411-412 contact wear ring 321, but gear 323 does not contact assembly 201 within channel 413. Both rotating drive element 335 and rotating support element 336 are suspended by axles that are supported by brackets that are mounted on base assembly 301. Both rotating drive element 335 and rotating support element 336 are free to rotate about their central axes. The drive shaft of motor 337 is attached to a coupling element 334, thereby enabling motor 337 to turn rotating drive element 335 of drive assembly 331. Rotating drive element 335 thereby rotates main auger assembly 320 via gear elements 333 and 323. In the described embodiment, motor 337 is a 10 hp hydraulic motor capable of turning main auger assembly 320 at a rate of 0-10 rotations per minute (rpm). In the described example, motor 337 is part number EAT104-1006-006, available from Spencer Industries.

Idler assembly 332 supports main auger assembly 301 as the main auger assembly is rotated. More specifically, wear ring 322 rotates on first rotating wear ring 431 and second rotating wear ring 432. In the described embodiment, each of wear rings 431-432 has an outside diameter of 21 inches. Wear ring 322 rests on wear rings 431-432. Wear ring 322 rotates freely on wear rings 431-432, thereby enabling the entire auger assembly 320 to rotate in response to motor 337. Wear rings 321-322 and 431-432 are made of a material that is more resistant to wear than soil tube 324. For example, wear rings 321-322 and 431-432 can be made of A36 steel having a thickness of ½ inch.

A soil feed chute 341 is attached to front support element 311. Chute 341 includes an upper opening for receiving contaminated soil, and a lower opening for feeding contaminated soil through front support element 311 into tube 324. The contaminated soil can be loaded into the upper opening of chute 341 in a controlled manner by various means, including a conveyor belt 351.

A set of four lifting paddles 1-4 are located inside soil tube 324. The ends of these lifting paddles 1-4 are shown in FIG. 5. Lifting paddles 1-4 have angled ends, which help to hold soil as the soil tube is rotated. The direction of rotation, R, is illustrated in FIG. 5. Lifting paddles 1-4 each follow a spiral pattern along the length of soil tube 324. This spiral pattern is shown schematically by line 325 in FIG. 3. Note that the lifting paddles maintain a spacing of about 90 degrees throughout this spiral pattern. This spiral pattern helps to move soil from the first end of soil tube 324 to the second end of soil tube 324, as soil tube 324 is rotated. Lifting paddles 1-4 also cause the contaminated soil to be lifted over, and then dropped down upon, vapor tube 313. As a result, the soil does not clog the vapor openings 315 in vapor tube 313. As described in more detail below, vapor tube 313 is heated to a temperature of about 500 to 1200° F. by vapor produced by vapor generator 100. When the contaminated soil comes into contact with vapor tube 313, the hydrocarbons and volatile organic compounds (VOC's) present in the contaminated soil are cracked, thereby eliminating the hydrocarbons, and providing one or more by-product gasses. The high temperature vapor tube 313 also eliminates other contaminants from the soil, such as mercury.

Decontaminated soil exits the second end of soil tube 324, and falls through exit chute 342, which extends through base assembly 301 and platform 307. The decontaminated soil can then be removed, for example, by a conveyor belt assembly 352.

In accordance with one embodiment, a cover 360 extends over main auger assembly 320, as illustrated in FIG. 3. This cover 360 is used to collect the gases that are expelled from soil tube 324. These gases include water vapor that is expelled through the holes 315 in the bottom of vapor tube 313. These gases also include the by-product gases created by decontaminating the soil. The air supply line 201 of vapor generator 100 is attached to cover 360, such that air blower 202 pulls in air present under cover 360. As a result, remaining contaminants in the by-product gases are burned when returned to vapor generator 100.

In the foregoing manner, the soil remediation system 300 is capable of efficiently cleaning contaminated soil. Soil remediation system 300 can easily be moved to job sites, thereby eliminating the need to transport contaminated soil over long distances. Soil remediation system 300 can advantageously be run in remote locations, because the motor 337, blower 202, ignition control unit 212 all run from battery power, fuel supply 222 can be provided in portable tanks, and water is either readily available or can be provided by portable tanks.

The various embodiments of the structures and methods of this invention that are described above are illustrative only of the principles of this invention and are not intended to limit the scope of the invention to the particular embodiments described. For example, although soil tube 324 has been described as having a horizontal arrangement, it is understood that one end of soil tube 324 may be elevated with respect to the other end.

In addition, although the vapor generator 100 has been described in connection with the application of soil remediation, it is understood that vapor generator 100 can be used in many other applications in accordance with other embodiments of the present invention. Some of these other applications are described below. Other applications would be apparent to one of ordinary skill in the art.

Oil Industry Applications

Currently there are oil fields where the natural viscosity of the oil is greater than the current ability to pump the oil to the surface. This oil is hereinafter referred to as 'heavy oil'. In these cases, the heavy oil and or heavy oil field is heated to reduce the viscosity of the oil, thereby enabling pumping. Currently the source of heat is steam and/or hot water. The cost of heating the steam or hot water is the largest operational cost in the production of the retrieval of the heavy oil. In general, a large high-pressure boiler is used to generate steam at a central location. The steam is then routed from the high-pressure boiler to the various heavy oil wells using a network of distribution pipes. The steam must travel over undesirably long distances to reach the various heavy oil wells, thereby resulting in inefficient heat transfer. In addition, a water treatment plant is typically required to improve the quality of the water provided to the boiler. Much of the heavy oil reserves in the world are currently untapped because it is economically prohibitive to remove the oil from the ground.

Figure 6:
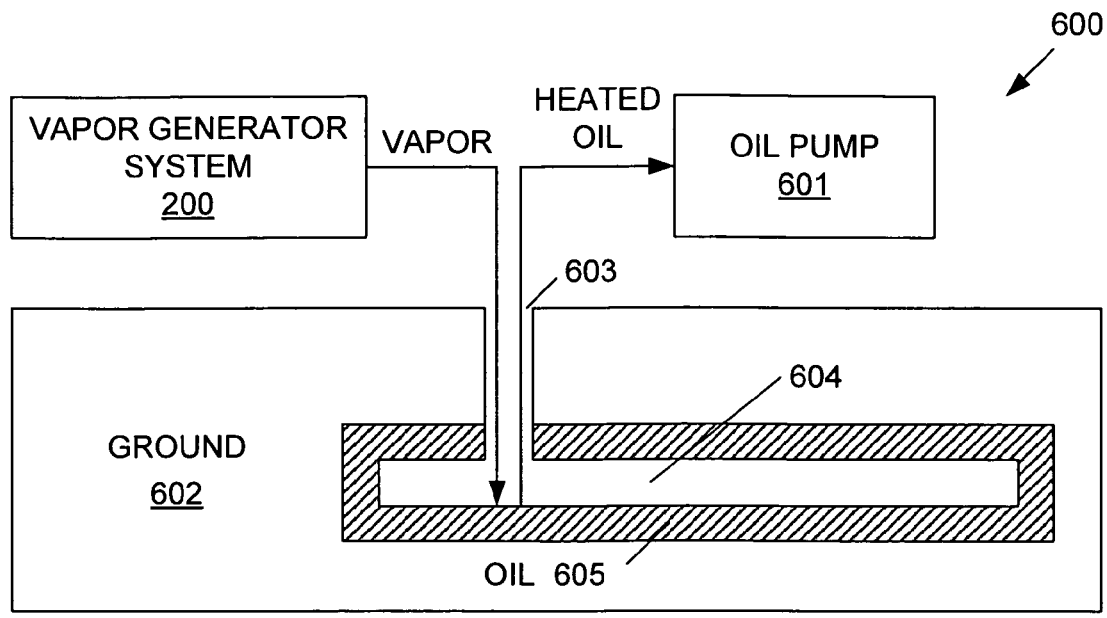
FIG. 6 is a block diagram of an oil extraction system, which uses high-temperature water vapor generated by the vapor generator system of FIG. 2 to assist in the pumping of oil.

In accordance with another embodiment of the present invention, each oil well site can be configured to receive the steam generated by a corresponding on-site vapor generator system 200. FIG. 6 is a block diagram of an oil well site 600 having a corresponding on-site vapor generator system 200. In this embodiment, vapor generator system 200 provides vapor into an opening 603 in the ground 602 which leads to an underground cavity 604 that contains heavy oil 605. The vapor heats the heavy oil 605, thereby resulting in lower viscosity oil that can be pumped out of the ground by an oil pump 601. Note that oil pump 601 may use the same opening or a different opening than vapor generator system 200.

In the illustrated embodiment, the large high-pressure boiler, water treatment plant and distribution pipes of a conventional steam generating system can be eliminated. Consequently, the use of vapor generator system 200 will significantly reduce the cost of extracting heavy oil from these oil fields.

Additionally, vapor generator system 200 can be used to force heat into oil fields where the oil is located in rock, shale or other difficult geologic formations and at the end of the life cycle of an oil well or oil field. The process of heating the well or field reduces the viscosity for any oil or remaining oil that might be in rock, shale and or other geologic formations to allow for its pumping to the surface. Vapor generator system 200 will significantly reduce the cost of providing the heat necessary for production of oil in these situations.

Additionally, oil wells that are in production require maintenance. This maintenance includes the cleaning of oil and tar from the well piping and is normally accomplished with steam or hot water. Vapor generator system 200 will significantly reduce the cost of providing the heat necessary for the maintenance of these wells.

Industrial Applications

Other industrial applications for vapor generator system 200 include:

Food preparation, including steam heat for cooking and baking, steam for cleaning and disinfection, steam and heat for pouching and or removing fruit and vegetable skins.

Providing steam and heat for cleaning and disinfection of meat and poultry processing facilities.

Providing steam and heat for snow and ice removal from roads, sidewalks, driveways, walkways, roofs, heliports and aircraft runways. This snow and ice removal can be provided by mounting vapor generator system 200 on a mobile vehicle, such as a snow plow.

Providing steam and heat for the desalinization of sea water (e.g., for evaporation or the generation of energy used in the desalination process).

Figure 7:
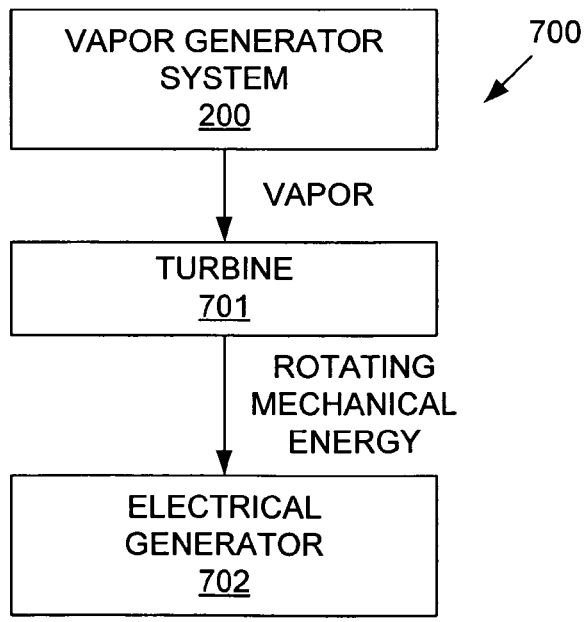
FIG. 7 is a block diagram of an electrical generating system, which generates electricity in response to high-temperature water vapor generated by the vapor generator system of FIG. 2.

Providing steam and heat to generate electricity from turbines. FIG. 7 is a block diagram illustrating an electrical generating system 700, which includes vapor generator system 200, turbine 701 and electrical generator 702. The high-temperature water vapor generated by vapor generator system 200 is used to rotate turbine 701. In response, turbine 701 rotates conductive elements in electrical generator 702, thereby causing this generator 702 to generate electricity.

Providing steam and heat to power turbines for the purpose of chilling water or glycol.

Providing steam and heat to provide energy for absorption chillers to chill water or glycol.

Providing steam and heat to preheat fuel in cold climates or applications.

Providing steam and heat to systems that are used to provide warmth to divers and other underwater situations requiring protection from cold water.

Providing steam and heat for industrial dryers or any industrial process that requires heat for a drying process.

Providing steam and heat for sludge drying.

Providing steam and heat for curing various materials, i.e. carbon fiber, fiberglass, concrete.

Providing steam and heat for space heating and humidification.

Providing steam and heat for the lumber industry for kiln drying, bark stripping, cleaning and disinfection.

Providing steam and heat to strip paint and other coverings.

Providing steam and heat for distilling spirits.

Providing steam and heat for fractional distillation.

Providing steam and heat for cleaning and disinfection.

Providing steam and heat to clean rubber and other contaminants from military and commercial aircraft runways.

Providing effluent pond heating for natural gas processing plants.

Providing heat to maintain the temperature of municipal effluent holding and treatment ponds, thereby ensuring a continuous high level of biological degradation, especially in regions that experience extreme seasonal temperature changes.

Providing heat to the aggregate wash water at concrete batch plants.

Providing heat to log ponds and conditioning chests in plywood, veneer, orientated strand board (OSB), waferboard, chopstick plants.

Providing heat for protecting pulp and paper mill water intake protection against freezing, and white water solution heating.

Providing heat to barren solutions for ore extraction in heap leach mining operations.

Providing heat to barren brine solution to maximize solubility and recovery of potash in flooded potash mines.

Providing heat for coal thawing for conveying.

Providing heating of bulk carpet and fabric dyes in carpet and fabric manufacturing plants.

Providing heat for the evaporation of waste water to recover water treatment chemicals in cogeneration plants with zero effluent discharge.

Providing heat for distillation or absorption in various industrial processes.

Environmental/Agricultural Applications

Some environmental/agricultural applications for vapor generator 100 include:

Cleaning soil in and around underground petroleum storage tanks.

Providing steam and heat for the soil vapor extraction process.

Providing steam and heat for sewer and water treatment sludge drying.

Providing steam and heat for field disinfection.

Providing steam and heat for weed removal.

Providing steam and heat for drying and or disinfection of animal manure.

Providing steam and heat for the conversion of organic waste to other products. For example, green waste may be run through the above-described soil remediation system (instead of contaminated soil), thereby greatly reducing the volume and weight of the resulting product.

Providing steam and heat for space heating and humidification of "hot houses" and other enclosed structures used to grow plants.

Providing steam and heat for heating of fields and orchards.

Providing steam and heat for the treatment of diseases of trees and other plants i.e. sudden oak death.

Medical Applications

Some medical applications for vapor generator 100 include:

Providing steam and heat for bulk sterilization of equipment.

Providing steam and heat for autoclaves.

Providing steam and heat for disinfection.

Providing steam and heat for cleaning of buildings, rooms and equipment.

Providing steam and heat for control of manufacturing processes, i.e. temperatures in fermentation and other processes.

Providing steam and heat for animal research facilities.

Commercial/Residential Applications

Some commercial/residential applications for vapor generator 100 include:

Providing steam and heat for building heating and cooling systems.

Providing steam and heat for building hot water systems.

Providing steam and heat for building humidification systems.

Providing steam and heat for driveway, walkway and sidewalk heating systems.

Providing steam and heat for snow and ice removal.

Providing steam and heat for snow disposal.

Providing steam and heat for paint and wall paper removal.

Providing steam and heat for building cleaning and restoration.

Providing steam and heat for pressure and steam cleaning.

Providing steam and heat for building electrical cogeneration systems.

Although the invention has been described in connection with several embodiments, it is understood that this invention is not limited to the embodiments disclosed, but is capable of various modifications, which would be apparent to one of ordinary skill in the art. Accordingly, the present invention is only limited by the following claims.

What is claimed is:

1. A vapor generator comprising:
    a combustion chamber having a first end and a second end, located opposite the first end;
    means for initiating combustion at the first end of the combustion chamber;
    an outer structure surrounding the combustion chamber, wherein a cavity is located between the combustion chamber and the outer structure;
    a water inlet located at the outer structure adjacent to the first end of the combustion chamber, wherein the water inlet is configured to receive water into the cavity;
    a water outlet located at the outer structure adjacent to the second end of the combustion chamber, wherein the water outlet is configured to receive water from the cavity;
    a water injection element configured to introduce water into the combustion chamber at a location adjacent to the first end of the combustion chamber; and
    a water conduit coupling the water outlet to the water injection element, wherein the water conduit is configured to transfer water from the cavity to the water injector element.

2. The vapor generator of claim 1, wherein the water injection element extends through the combustion chamber and the outer structure.

3. The vapor generator of claim 1, further comprising means for holding the vapor generator in an upright position, wherein the first end of the combustion chamber is located at a higher elevation than the second end of the combustion chamber.

4. The vapor generator of claim 1, further comprising a water pump coupled to the water inlet, wherein the water pump regulates the flow of water into the water inlet.

5. The vapor generator of claim 1, wherein the water injector element is configured to spray water into the combustion chamber.

6. The vapor generator of claim 1, wherein the means for initiating combustion comprise:
    an ignition source located in the combustion chamber adjacent to the first end;
    a fuel inlet configured to receive fuel into the combustion chamber adjacent to the first end; and
    an air inlet configured to receive air at the first end of the combustion chamber.

7. The vapor generator of claim 6, further comprising a blower configured to force air into the air inlet.

8. The vapor generator of claim 6, further comprising a baffle element coupled to the air inlet, wherein the baffle element shields the ignition source and the fuel inlet from the air inlet.

9. The vapor generator of claim 6, wherein the ignition source and the fuel inlet are located on opposite sides of the combustion chamber.

10. The vapor generator of claim 6, wherein the ignition source comprises a spark plug.

11. The vapor generator of claim 6, further comprising a vapor outlet located at the second end of the combustion chamber, wherein the vapor outlet is configured to provide vapor exhaust from the combustion chamber.

12. The vapor generator of claim 1, wherein the combustion chamber comprises a first cylindrical element and the outer structure comprises a second cylindrical element, wherein the cavity is located between the first and second cylindrical elements.

13. The vapor generator of claim 12, wherein the first and second cylindrical elements are tapered at each end.

14. The vapor generator of claim 13, further comprising:
a first connector element joining first ends of the first and second cylindrical elements, wherein the combustion chamber is exposed through an opening in the first connector element; and
a second connector element joining second ends of the first and second cylindrical elements, wherein the combustion chamber is exposed through an opening in the second connector element.

15. A method of generating water vapor, comprising:
introducing water to a cavity that surrounds a combustion chamber, wherein the water is introduced at a location adjacent to a first end of the combustion chamber;
removing water from the cavity at a location adjacent to a second end of the combustion chamber, opposite the first end;
routing the water removed from the cavity into the combustion chamber at a location adjacent to the first end of the combustion chamber;
introducing fuel and air into the combustion chamber at the first end;
igniting the fuel and air, thereby heating the water in the combustion chamber to create water vapor, and preheating the water in the cavity surrounding the combustion chamber.

16. The method of claim 15, further comprising forcing the water into the cavity, forcing the water out of the cavity and forcing the water into the combustion chamber.

17. The method of claim 15, wherein the step of igniting the fuel and air comprises continuously introducing sparks at the first end of the combustion chamber.

18. The method of claim 15, further comprising introducing the air into the combustion chamber through a baffle.

19. The method of claim 15, wherein the air is introduced at a rate in the range of about 100 to 500 cubic feet per minute (cfpm) at a maximum pressure in the range of about 2 to 5 pounds/square inch (psi).

20. The method of claim 15, further comprising exhausting the water vapor at the second end of the combustion chamber.

* * * * *